United States Patent [19]
Suh

[11] Patent Number: 5,824,215
[45] Date of Patent: Oct. 20, 1998

[54] WATER PURIFIER

[75] Inventor: Sang-Wook Suh, Pyungtaek, Rep. of Korea

[73] Assignee: Samsung Electronics Co., Ltd., Suwon, Rep. of Korea

[21] Appl. No.: 795,562

[22] Filed: Feb. 6, 1997

[30] Foreign Application Priority Data

Feb. 6, 1996 [KR] Rep. of Korea ..................... 1996-2834

[51] Int. Cl.⁶ ................................................. B01D 35/30
[52] U.S. Cl. .......................... 210/249; 210/258; 210/259; 210/321.6; 210/428; 210/433.1
[58] Field of Search ..................................... 210/249, 258, 210/259, 294, 321.6, 416.1, 416.3, 428, 652; 248/94

[56] References Cited

U.S. PATENT DOCUMENTS

| | | | |
|---|---|---|---|
| 3,992,301 | 11/1976 | Shippey et al. | 210/652 |
| 4,681,677 | 7/1987 | Kuh et al. | 210/259 |
| 5,567,311 | 10/1996 | Jang | 210/416.3 |

*Primary Examiner*—Matthew O. Savage
*Attorney, Agent, or Firm*—Burns, Doane, Swecker & Mathis, L.L.P.

[57] ABSTRACT

A water purifier includes a support body having a wide bottom portion for supporting the purifier, and a vertical wall panel having front and rear sides. Filter members for purifying water are mounted on the body at the front side thereof, and a pump, circuit board, electric transformer, and fluid control valves are mounted on the body at the rear side thereof to balance the weight of the purifier.

5 Claims, 6 Drawing Sheets

WATER PURIFIER

BACKGROUND OF THE INVENTION

1. Field of the Invention

This invention relates to a water purifier, and more particularly to a below-the-sink reverse osmosis water purifier for removing various harmful impurities contained in the potable water.

2. Description of the Prior Art

Generally, a water purifier serves to remove various harmful materials contained in fresh water to thereby provide purified water.

Such a water purifier is divided according to purifying method into a natural filtering type, a direct filtering type, an ion exchange type, a reverse osmosis type and so on. Especially, the water purifier of the reverse osmosis type serves to apply a certain amount of pressure to the fresh water to cause same to pass through an artificial semipermeable membrane for water purifying. The water purifier then isolates and removes heavy metals, bacteria, cancer-causing materials, etc. and at the same time causes only the pure water and dissolved oxygen to pass therethrough. The water purifier has been used in high technology scientific or precision industries for cleansing electronic elements or at hospitals for medical use, and in recent years is used for providing potable water to households and shops.

A reverse osmosis water purifier, as shown in FIG. 1, comprises a plurality of filtering members 40 which purify the fresh water provided from a water pipe 30 connected with a faucet 20 disposed under a sink 10, by removing impurities contained therein; a storage tank 50 installed near the plurality of the filtering members 40 for storing purified water purified by passing sequentially through the plurality of the filtering members 40; and a purified water tap 70 for receiving the purified water stored in the tank 50 through a purified water pipe 60 to thereby discharge (dispense) same at the sink 10.

In other words, the filtering members 40 comprise a prefilter 41, a carbon filter 42 and a post filter 43 for eliminating various impurities including rust and chloride elements contained in the fresh water supplied from water pipe 20; a membrane filter 44 for removing heavy metals and cancer-causing materials contained in the fresh water and at the same time for providing the purified water to the purified water storage tank 50; and a post-processing filter 45 for absorbing and eliminating chloride odor and organic matter.

Further, a concentrated water pipe 80 is disposed between the membrane filter 44 and discharging pipe 12 in order that concentrated (waste) water made while passing through the membrane filter 44 can be discharged through the discharging pipe 12.

The plurality of filtering members 40, as shown in FIG. 2 and FIG. 3, are mounted by a bracket 90 formed by a steel plate bent in a stair shape. That is, the prefilter 41, the carbon filter 42 and a post filter 43 are respectively mounted to extend vertically at a lower surface of a rear horizontal part 91 of the bracket 90, while the membrane filter 44 is mounted at an upper surface of the horizontal part 91 and the post-processing filter 45 is mounted to extend horizontally above the membrane filter 44.

Further, a vertical part 92 is integrally formed underneath the horizontal part 91 at a right angle and a compression pump 110 is mounted on an outer surface of the vertical part 92.

However, there is a problem with the conventional water purifier thus constructed in that it has no outer case containing the filtering members and is constructed with a plurality of the filtering members 40 on a rear end of the bracket 90, thereby causing a mounting area for circuit elements (not shown) and the compression pump 110 to be disposed in a cramped area. Also, the water purifier must be mounted aslant in the sink 10 for the water purifier cannot be balanced due to different gravity centers of the plurality of filtering members 40.

Accordingly, the present invention is provided to solve the above problems, and it is an object of the present invention to provide a water purifier whose size is minimized and which is capable of easy assembly and disassembly whereby an inclination thereof caused by an unbalancing of the water filled filtering members is prevented.

SUMMARY OF THE INVENTION

The above and other objects are achieved according to the invention by a water purifier employing a plurality of filtering members and hoses connecting the filtering members to eliminate various impurities contained in the fresh water, further comprising a body containing the filtering members mounted at a certain frontal height by way of a bracket and a compression pump, a concentrated water control valve, a circuit board, a high voltage transformation and the like at a predetermined rear height and having a large-bottomed area in order to balance weight of these elements.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENT OF THE INVENTION

Figure 1:
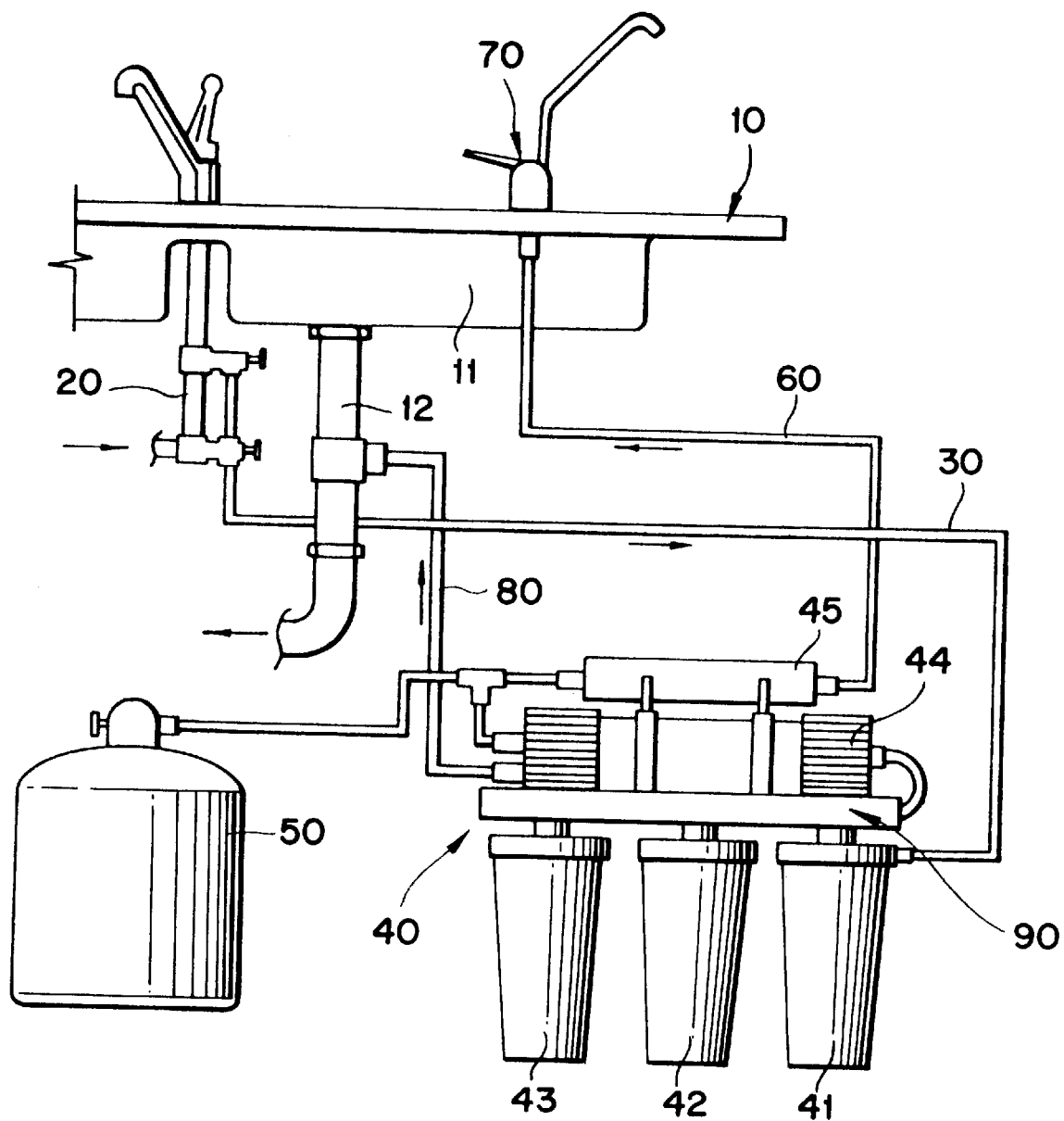
FIG. 1 is a schematic view showing a conventional water purifier and its construction.
Figure 2:
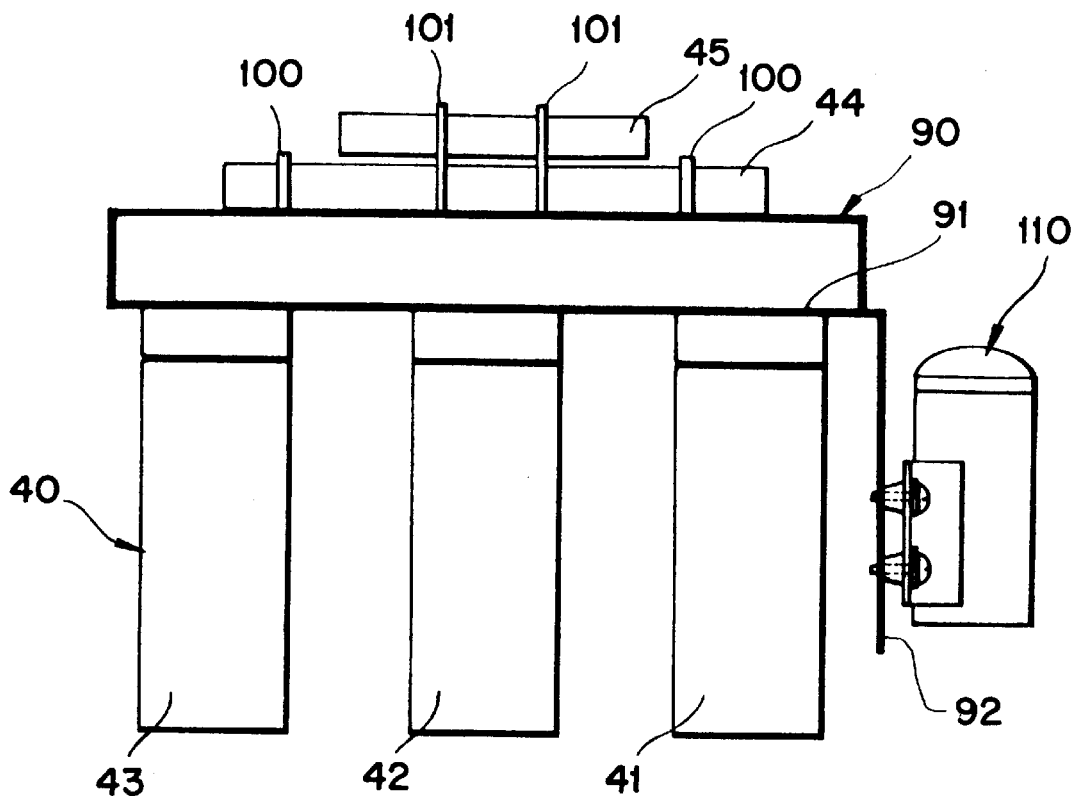
FIG. 2 is a front view of the conventional water purifier.
Figure 3:
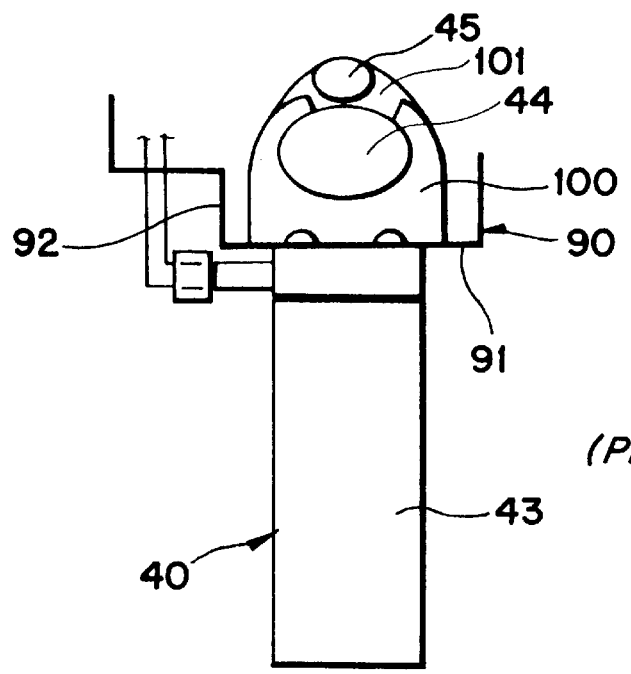
FIG. 3 is a side view of the conventional water purifier.

The preferred embodiment of the present invention will now be described in detail with reference to the accompanying figures. Throughout the drawings, like reference numerals are used for designation of like or equivalent parts or portions for simplicity of illustration and explanation.

Figure 4:
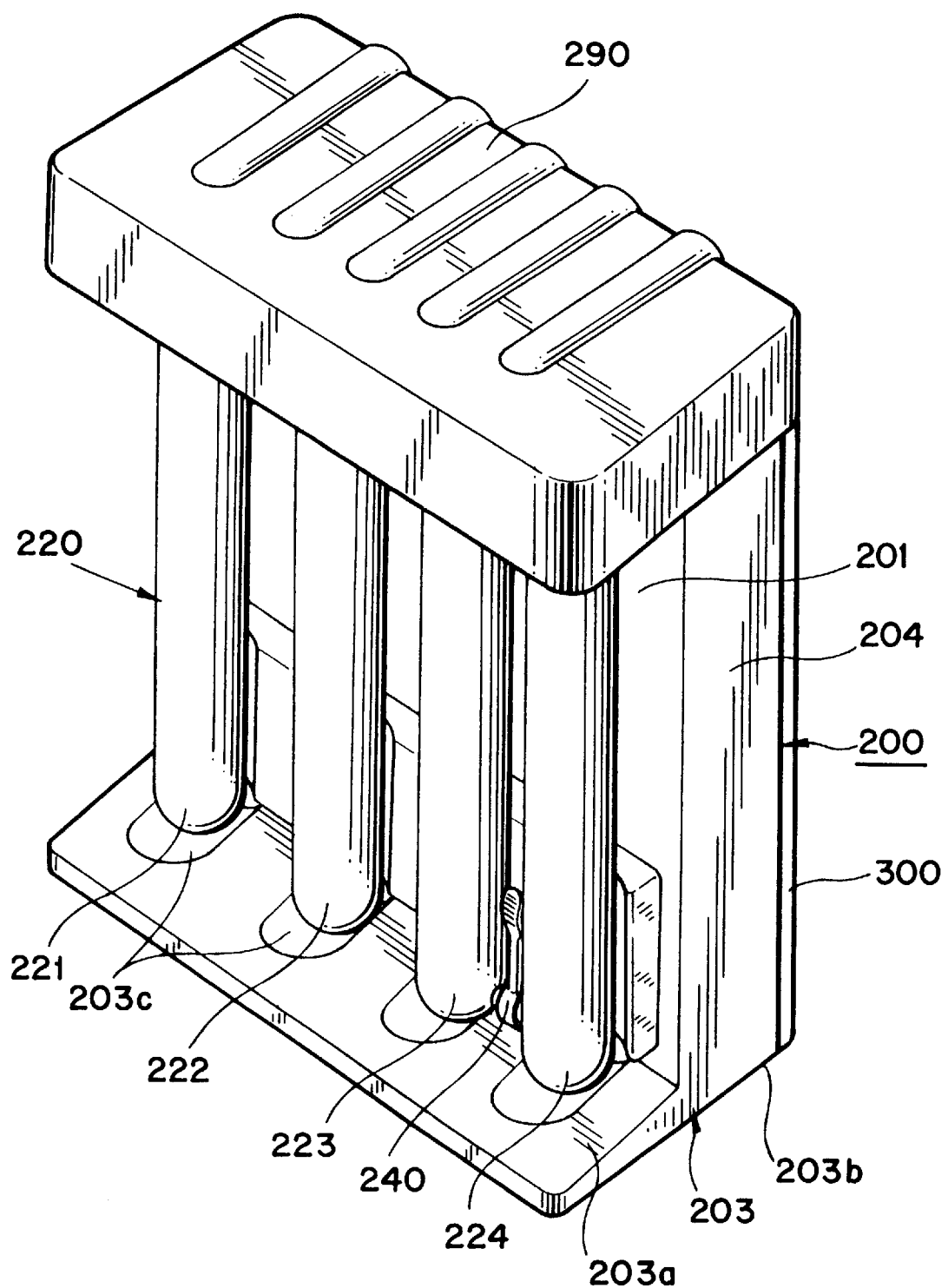
FIG. 4 is a top front perspective view of a water purifier according to the present invention.
Figure 5:
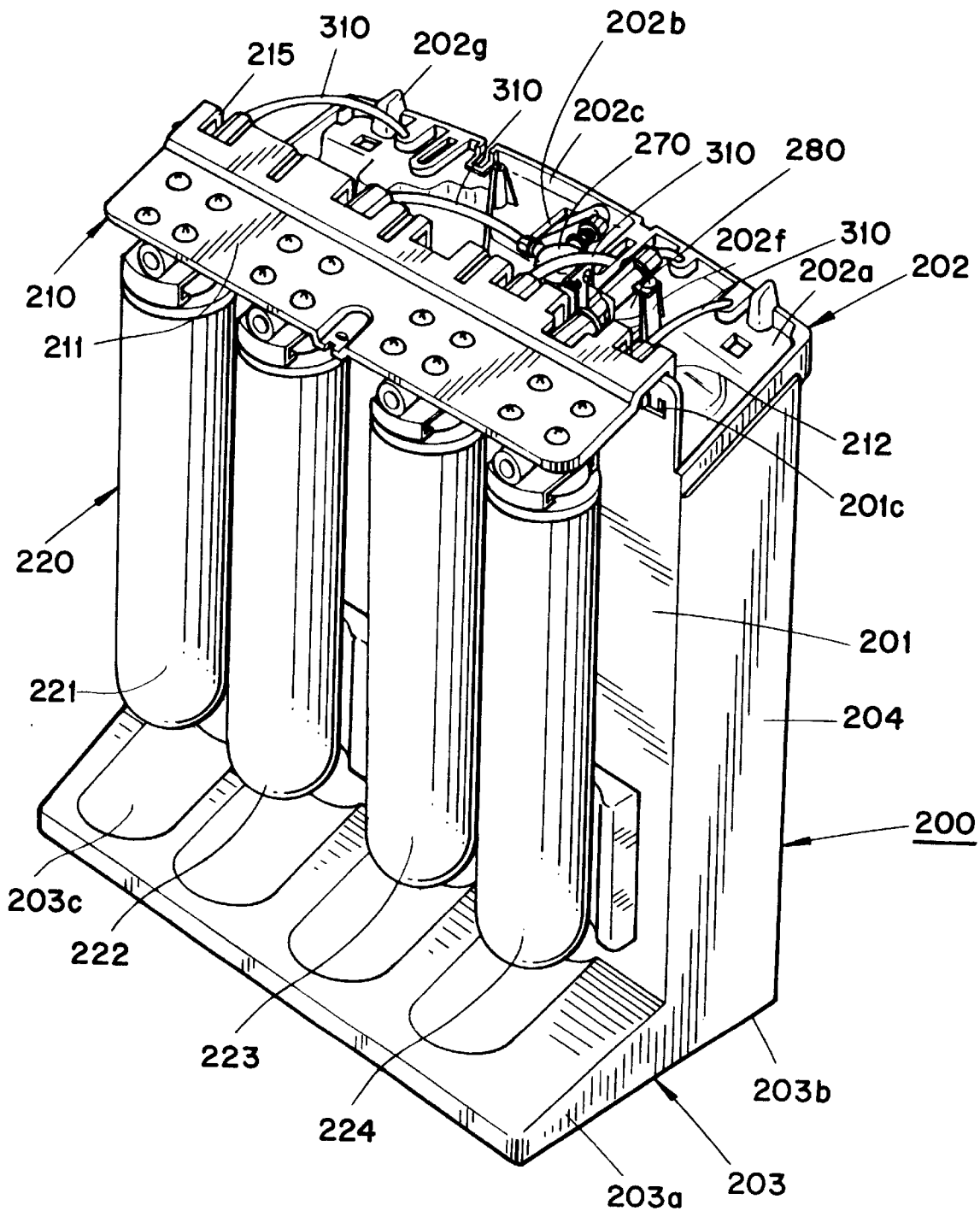
FIG. 5 is a top front perspective view of the water purifier according to the present invention showing an interior thereof.
Figure 6:
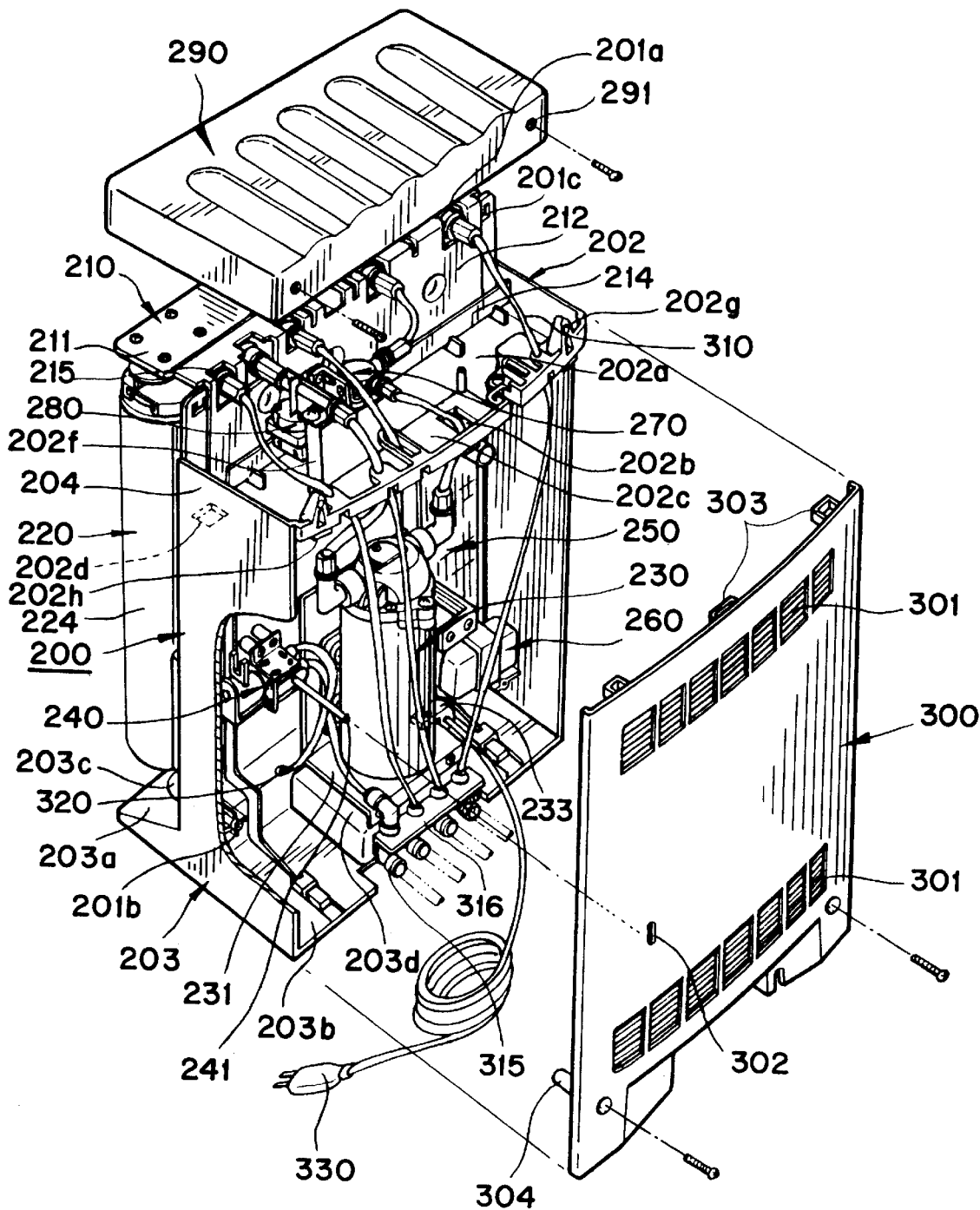
FIG. 6 is a top rear perspective exploded view of the water purifier according to the present invention; and, FIG. 7 is a vertical cross sectional view of the water purifier according to the present invention.
Figure 7:
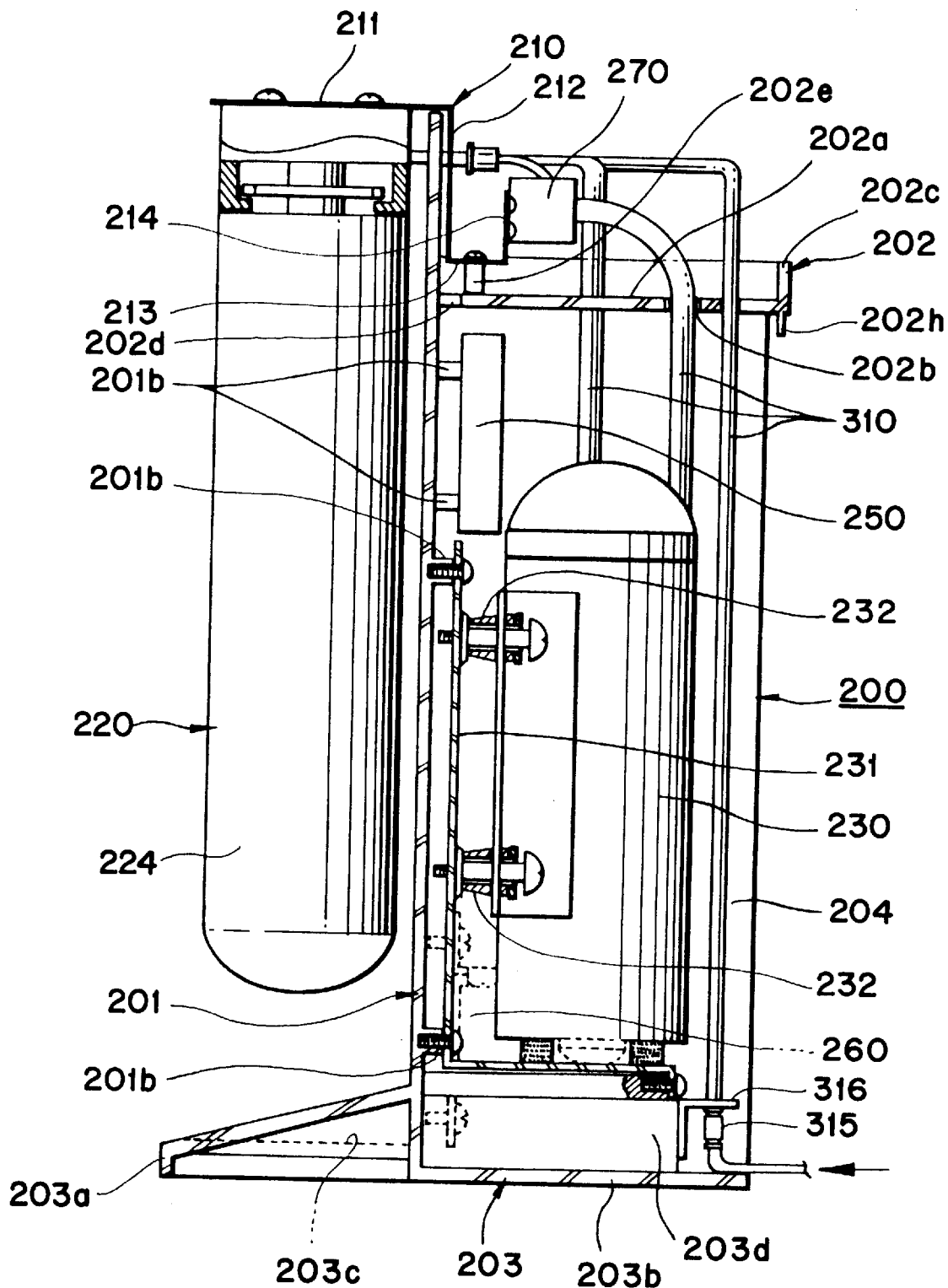

A water purifier according to the present invention, as shown in FIG. 4 to FIG. 7, comprises: a body 200 injection-molded of resin; a bracket 210 formed by bending a steel plate and mounted at an upper part of the body 200; a plurality of filtering members 220 releasably mounted, and each being disposed at a predetermined spacing with respect to a frontal part of the body 200 by way of the bracket 210; a compression pump 230, a concentrate control valve 240, a circuit board 250 and a high voltage transformer 260 mounted at a certain height at a rear wall thereof; a purified water flow control valve 270 mounted at a rear upper part of the body 200 by use of the bracket 210 in order to control flow of the purified water; a purified water storage control valve 280 mounted at a certain height on the body 200 in order to sense a hydraulic pressure and to control activation of a purified water process when the purified water passing through some of the filtering members inflows in the purified water storage tank (not shown); an upper lid 290 mounted at an upper part of the body 200 in order to cover an upper part of the filtering members 220; and a rear lid 300 covering a rear part of the body 200.

That is, the body 200 comprises a vertical wall panel 201 having a certain height and integrally formed with an upper panel 202 and a lower panel 203; and side wall panels 204, each panel 204 having a predetermined width and extending rearward from the vertical wall panel 201 and the upper and the lower panel 202 and 203.

Through holes 201a (FIG. 6) are formed at the upper part of the vertical wall panel 201 at certain locations corresponding to filtering members 220 in order to easily attach and detach the connecting hoses connected with a plurality of the filtering members 220, and a fixing rib 201b is integrally protruded at left and right sides of a lower end of a rear surface of the vertical wall panel 201. Latching holes 201c are formed at left, right and center side of the upper end of the panel 201 in order to interlock the upper cover 290 thereto.

A top surface 202a of the panel 202 has a plurality of pass holes 202b at the rear part thereof (FIG. 7) through which the connecting hoses 310 are passed, and a water overflow preventing guard 202c is integrally and upward protruded from the surface 202a. Discharging holes 202d are formed at a corner of the surface 202a so that the water gathered thereon is discharged down along a rear surface.

Further, a plurality of first fixing ribs 202e (FIG. 7) are integrally and upwardly protruding at a front side of surface 202a, so that the rear side of the bracket 210 is meshed thereto at a certain height, and a second fixing rib 202f (FIG. 6) is integrally and upwardly protruding from surface 202a, and the purified water storage control valve 280 is connected thereto by screws.

Also, third fixing ribs 202g (FIG. 5) are integrally formed at the left and right side of the upper surface of the water overflow prevention guard 202c so as to receive screws to attach the upper lid 290, and a plurality of latches 202h (FIG. 7) are integrally formed at the left, right and center side of the lower surface of the rear cover 300.

The lower panel 203 has a front extension 203a and a rear leg 203b integrally formed with the vertical wall panel 201 in order that the water purifier is not tilted due to an unbalanced weight center of the plurality of filtering members 220, and a plurality of round-shaped interference prevention grooves 203c (FIG. 5) are formed beneath respective filtering means 220 in the upper surface of the extension 203a to facilitate replacement of the plurality of filtering members.

Also, a block 203d is formed at the center of the upper surface of the leg 203b, and a support member 316 supporting a plurality of connecting joints 315 is connected to a rear surface of the block 203d.

Meanwhile, the bracket 210 includes a first horizontal part 211 protruding forwardly from an upper side of the body 200 in order to support the plurality of filtering members 220. A first vertical part 212 is bent downwardly at a right angle at a rear side of the first horizontal part 211 in order to contact a rear surface of the vertical wall panel 201 of the body 200. A second horizontal part 213 is backwardly bent at a right angle at a lower side of the first vertical part 212, and a second vertical part 214 is upwardly bent at a right angle at a rear side of the second horizontal part 213 in order to support the purified water flow control valve 270.

Furthermore, a plurality of through holes 215 are formed at a corner part where the first horizontal part 211 joins the first vertical part 212, so that the connecting hoses 300 connected with the plurality of filtering members 220 can pass therethrough.

Meanwhile, the plurality of filtering members 220 include (i) a sediment filter 221 mounted via the bracket 210 for being supplied with the fresh water through the connecting hoses 310 and for eliminating floating materials contained in the fresh water including rust, (ii) a pre-processing filter 222 mounted via the bracket 210 for being supplied with the fresh water from the sediment filter 221 and for eliminating harmful materials contained in the fresh water such as chlorides, (iii) a membrane filter 223 mounted via the bracket 210 for being supplied with the fresh water which is supplied to the compression pump 230 after leaving the pre-processing filter 222 and for eliminating various heavy metals and cancer-causing materials contained in the fresh water, and (iv) a post-processing filter 224 mounted via the bracket 210 for being supplied with the fresh water from the membrane filter 223 through connecting hose 310 and for absorbing and eliminating various odors and toxic gas elements contained in the fresh water.

A concentrated (waste) water discharging hose (not shown) extends from a lower side of the membrane filter 223 so as to discharge concentrated water generated therefrom and to be easily releasable from the filter 223 when the filters are replaced.

Meanwhile, the compression pump 230 is mounted at a certain height so that vibration and noises are not transferred to the body 200 during its operation.

That is, the compression pump 230 is movably connected via a vibroisolating rubber to a pump support bracket 231 connected to the rear surface of the body 200 and the block 203d of the lower panel 203.

Meanwhile, the concentrated water control valve 240 is connected at one side thereof to the concentrated water discharging hose of the membrane filter 223, and is mounted to the rear surface of the vertical wall panel 201.

A plurality of screw holes 291 (FIG. 6) are formed in the upper lid 290 at corresponding positions to the third fixing ribs 202g so as to be connected by a plurality of fastening screws (not shown) to the third fixing 202g formed on the upper panel 202 of the body 200.

A plurality of air circulating holes 301 (FIG. 6) are formed in upper and lower sides of the vertical surface of the rear cover 300 in order to dissipate the heat generated in the high voltage transformer 260, and a through hole 302 (FIG. 6) is formed in the vertical surface so that an end of a control shaft 241 of the concentrated water control valve 240 is outwardly exposed.

In addition, a plurality of latch projections 303 (FIG. 6) are formed on a front side of the vertical surface of the rear cover 300 so as to be respectively latched by the latches 202h formed on the upper panel 202 of the body 200, and a fixing rib 304 is formed on the front side of the lower part of the vertical surface to thereafter be coupled to the fixing rib 201b.

Now, the operation of the water purifier according to the present invention thus constructed will be described.

When a purified water faucet 70 is turned on in order to dispense purified water, power is applied to the compression pump 230 and, at the same time, the fresh water (tap water) flows sequentially through the plurality of filtering members 220 from a water supplying pipe 30 and is purified by eliminating various harmful materials.

In other words, the fresh, incoming water flows into the sediment filter 221 through the water supplying pipe 30, and floating materials in the water are eliminated; then the partly purified water flows into the pre-processing filter 222 and is discharged with harmful materials being eliminated; now, the more purified water flows into the compression pump 230 through the connecting hose 310 and is forced through the membrane filter 223 with heavy metals and cancer-causing materials being eliminated.

The purified water from the membrane filter 223 is delivered to the purified storage tank 50 through the connecting hose 310. In response to a control signal sent to the purified water storage control valve 280, stored purified water from the purified water storage tank 50 flows through the post-processing filter 224 with bad odors and gas elements being eliminated. And the purified water having passed through the post-processing filter 224 is guided to the purified water faucet 70 through the purified water pipe 60, and thereafter the purified water is discharged at the sink 10 as the faucet 70 is turned on.

At this time, the concentrated (waste) water generated in the membrane filter 223 is guided to the rear bottom of the purifier through the concentrated water connecting hose 320 connected to the concentrated water discharging hole 223a formed on a lower side of the membrane filter 223 according to control of the valve 240, and at the same time, is discharged to the discharging pipe 12 of the sink 11 through the concentrated water pipe 80 to thereby prevent contamination of the membrane filter 223 caused by deposition of concentrated water and prolong the life of the filter.

As is apparent from the foregoing, there is an advantage in the above described water purifier of the present invention in that it is possible to minimize a body size of a water purifier and make easier an assembly and a disassembly of the purifier and to prevent the purifier from tilting to one side by an unbalanced weight of the filter members filled with water, because a plurality of the filtering members are mounted on a front part of the body and the electronic units are mounted at a rear part of the body to thereby enable a bottom area thereof to be widened for balancing the weight of the body.

What is claimed is:

1. A water purifier for removing harmful materials from fresh water, comprising:

a body having a bottom section upon which the body is supported in an upright manner, the body including a front side and a rear side;

a filter assembly comprising a plurality of water filtering members disposed at the front side of the body, at least one of the filtering members producing waste water;

a bracket mounted on the body for supporting the filtering members;

a compression pump mounted on the body at the rear side thereof for forcing fresh water through at least one of the filtering members;

a waste water control valve mounted on the body at the rear side thereof and operably connected to the filter assembly for discharging waste water;

a high voltage transformer mounted on the body at the rear side thereof for supplying an operating voltage; and a circuit board mounted on the body at the rear side thereof and operably connected to the pump, control valve, and transformer;

wherein the body comprises a vertical wall panel defining the front and rear sides, a pair of vertical side panels disposed at opposite edges of the vertical wall panel, a horizontal upper panel interconnecting upper ends of the side panels, a horizontal lower panel interconnecting lower ends of the side panels;

wherein the bracket comprises:

a first horizontal part protruding forwardly from an upper side of the body in order to support the filtering members;

a first vertical part bent downwardly at a right angle from a rear side of the first horizontal part in order to contact the rear side of the vertical wall panel of the body;

a second horizontal part bent rearwardly at a right angle from a lower edge of the first vertical part; and a second vertical part bent upwardly at a right angle from a rear edge of the second horizontal part.

2. The water purifier according to claim 1 wherein the lower panel extends past the front and rear sides of the vertical wall panel to stabilize the body.

3. The water purifier according to claim 2 wherein an upper surface of the lower panel is situated beneath the filter assembly and includes grooves situated beneath the filter assembly, and grooves situated beneath respective ones of the filtering members for facilitating removal and insertion thereof.

4. The water purifier according to claim 1, further including a purified water flow control valve mounted to the body at the rear side thereof and adjacent the first vertical part of the bracket.

5. The water purifier according to claim 1 wherein the filtering members include a membrane filter producing the waste water.

* * * * *